United States Patent Office
3,316,191
Patented Apr. 25, 1967

3,316,191
CURING EPOXY RESINS
Lewis Montesano, Upper Montclair, N.J., assignor to Bell Telephone Laboratories, Incorporated, New York, N.Y., a corporation of New York
No Drawing. Filed Aug. 8, 1961, Ser. No. 129,949
4 Claims. (Cl. 260—18)

This invention relates to a process for curing epoxy resins.

More particularly, the present invention is directed to a novel method for curing epoxy resins with polyamines or polyamides in the presence of an accelerator comprising dodecenyl succinic anhydride.

The epoxy resins are of recent origin and have acquired wide use in such applications as adhesives, laminates, castings, sealants, and coatings. For example, they have been particularly useful as bonding agents and laminates in the lamination of glass cloth and in bonding metal to metal, metal to wood, wood to wood, etc. The epoxy resins are initially obtained as viscous liquids, semisolids, or solids, and subsequently are cured either at ambient temperature or by heating in the presence of a suitable curing agent.

The epoxy resins generally consist of a polyether derivative of a polyhydric organic compound such as polyhydric alcohols and phenols containing at least two phenolic hydroxy groups, and are further characterized by the presence of at least two terminal 1,2-epoxy groups per molecule of epoxy resin. A typical 1,2-epoxy resin may be prepared by the reaction of epichlorhydrin with Bis-Phenol A [2,2-bis-(4-hydroxyphenyl)-propane], generally in alkaline solution. The epoxy resins may also be prepared from other 1,2-epoxy compounds including, for example, polyglycidyl ethers of ethylene glycol, propylene glycol, trimethylene glycol, diethylene glycol, triethylene glycol, glycerol, dipropylene glycol, etc. Similarly, other dihydric phenols may be employed, including resorcinol, catechol, hydroquinone, 4,4'-dihydroxybenzophenone, 1,1-bis-(4-hydroxyphenyl)-ethane, 1,1-bis-(4-hydroxyphenyl)-butane, 2,2-bis-(4-hydroxyphenyl)-butane (Bis-Phenol B), 1,5-dihydroxy-naphthalene, etc. The various epoxy resins formed from the reactants set forth above are not necessarily equivalent and, furthermore, the exact compositions of the epoxy resins are dependent upon the molecular proportions of the epoxy compound and dihydric phenol employed in its preparation. The epoxy resins so produced must then be cured or resinified in order to form the desired final product. Heretofore, the complex epoxy resins have been cured to an insoluble, infusible condition by means of a wide variety of materials, such as polyamines, polyamides, acid anhydrides, etc.

The polyamines and polyamides react with the complex epoxy resins causing the resin to cure to an infusible, insoluble state through the reaction of the amine or amide functional groups with the epoxy groups and to some extent through reaction between epoxy groups and hydroxy groups, catalyzed by the amines or amides. Generally, such techniques are effected at elevated temperatures which tend to have an adverse effect upon the properties of the resultant product.

The acid anhydrides may also be used as curing agents. However, they possess undesirable properties which have placed a considerable limitation on their commercial utilization. It has been found, for example, that the acid anhydrides show little activity in the cure of polyepoxides at room temperature or at slightly elevated temperatures and are effective only at high temperatures. This prevents their use in the preparation of compounds that are to be cured at room temperature or compositions that might be injured by high temperatures. Even at high temperatures, the anhydrides in many cases act slowly and are unable to be used in compositions which must be cured rapidly.

With the progression of the resin art, various combinations of curing agents and accelerators have been proposed. Thus, the use of a carboxylic acid anhydride in combination with a tertiary polyamine has become conventional for curing the polyepoxides, so obviating some of the undesirable features of prior techniques. However, such methods have not been completely acceptable since high temperatures are required for curing and the deficiencies of such high temperature treatment still exist.

In accordance with the present invention, rapid curing of epoxy resins is effected at room temperature in the presence of a curing agent comprising a primary or secondary polyamine or polyamide and an accelerator comprising dodecenyl succinic anhydride.

With respect to the amines which are suitable for the present purposes, the choice is wide, limited only by the requirement that the amine be a primary or secondary amine (aliphatic or aromatic) having two or more amine groups. Suitable reagents for this purpose include the aliphatic polyamines such as ethylene diamine, diethylene triamine, triethylene tetramine, tetraethylene pentamine, polyethylene polyamine, propylene diamine, dipropylene triamine, polypropylene polyamines, butylene diamines, pentylenediamines, hexylenediamines, octylenediamines, nonylenediamines, decylenediamines, dimethylurea, 1,3-diamine-2-propanol, 3,3'-imino-bis-(propylamine), guanidine, dimethylamino, diethylaminopropylamine, dibutylaminopropylamine, iminobispropylamine, and the like. Furthermore, the aromatic primary or secondary polyamines such as meta, ortho, and para-phenylenediamines, 1,4 - naphthalenediamines, 1,4 - anthradiamines, 3,3' - biphenyldiamine, xylylenediamine, 3,4-biphenylamine, 3,4-toluenediamine, alpha,alpha'-biparatoluidine, para,para'-methylene dianiline, 1-methoxy-6 methylmeta-phenylenediamine, para,para'-sulfonyldiamine, or heterocyclic primary and secondary polyamines, such as piperazine, 2,4-dimethylpiperazine, melamine, 2,4 - diamine - 5 - (aminomethyl) pyrimidine, 2,4,6-triaminopyrimidine, 3,9-bis-(aminoethyl) spirobimetadioxane, and the like may be employed. Other useful amines suitable for the present invention include addition products or adducts of polyamines and low molecular weight epoxides or a vinyl group containing compound.

The tertiary polyamines, such as N,N-dimethylbenzylamine, are not effective in the present room temperature curing system, which may be attributed to the fact that such compounds are not considered conventional room temperature hardeners. However, it may be noted that it is conventional to employ the tertiary amines as accelerators for polycarboxylic acid anhydrides at elevated temperatures with large anhydride to amine ratios, typically of the order of 100 to 1.

The polyamide compositions which may be utilized for curing the epoxy resins are in general those derived from polymeric fatty acids and aliphatic polyamines. Resins of this general type are disclosed in U.S. Patent 2,450,940. The product of such reaction may contain either terminal amine or carboxyl groups or a mixture of both, each of which is effective in curing the epoxy resins. The particular group desired will generally be determined by the type of curing sought since the amine functional group reacts more rapidly than the carboxyl group, so suggesting its use in rapid curing. The number of free amine groups or free carboxyl groups is measured as amine number or acid number, respectively, and is defined as the number of milligrams of potassium hydroxide equivalent to the free amine groups (or carboxyl groups) present in one gram of the resin. For the present purposes, resins having amine or acid numbers within the range of 200 to 300 are suitable, such resins beng added in an amount of 45 to 80 parts per 100 parts of resin (stoichiometric amounts). In order to achieve added flexibility amounts greater than the stoichiometric can be employed. The use of resins in an amount less than the stoichiometric quantity necessitate the use of a second curing agent, such as a polyamine.

The polymeric fatty acids employed in preparing the polyamides are those resulting from the polymerization of drying or semi-drying oils or the free acids or simple aliphatic alcohol esters of such acids. Suitable drying or semi-drying oils include soybean, linseed, tung, perilla, oiticica, cottonseed, corn, tall, sunflower, safflower, dehydrated castor oil, etc. These polymeric acids may be reacted with a variety of polyamines to yield the corresponding polyamide. Typical polyamines which may be used are diethylene triamine, triethylene tetramine, tetraethylene pentamine, 1,4 - diaminobutane, 1,3 - diaminobutane, hexamethylene diamine, 3 - (N - isopropylamino) propylamine, 3,3'-imino-bispropylamine, etc. Resins of this general type are described in U.S. Patent 2,450,940.

By use of conventional prior art techniques it is possible to produce a wide variety of epoxy resins having terminal amine groups or terminal carboxyl groups, or in which some of the terminal groups are amine while others are carboxyl. Since both amine groups and carboxyl groups are useful in curing the epoxy resins, it would be apparent that a wide variety of polyamides are useful for that purpose.

The activator or accelerator for the polyamines or polyamides comprises dodecenyl succinic anhydride in an amount up to approximately 1 part by weight of anhydride per 2 parts by weight of polyamine or polyamide. Variations beyond the upper limit of 1 to 2 may be tolerated although in many instances such ratios would be impractical due to rapid gelling of the polyamine. Although no specific lower limit may be established, it is noted that acceleration occurs even in the presence of small amounts of anhydride, for example, of the order of 1 to 100 (anhydride to polyamine or polyamide).

The amount of polyamine to be used in the process will vary over a wide range, depending on the functionality and molecular weight of the curing agent. It has been determined that resins having desirable properties may be obtained from mixtures containing the epoxide compositions set forth above and polyfunctional (primary or secondary) amines in such relative proportions as provide up to 1 amino hydrogen of the amine for each epoxy group contained by the epoxide composition or 8 to 40 parts by weight of polyamine per 100 parts of polyepoxide.

The present inventive technique as described above may be effected at room temperature. For the purposes of this invention, room temperature is defined as including ordinary room or ambient temperatures typically within the range of 20 to 25° C. although temperatures higher and lower may be employed. It is intended to include any curing process not requiring the application of heat. The cure may be accomplished by merely mixing the anhydride amine or amide combination with the polyepoxide and permitting the mixture to stand at room temperature. The process may be carried out in unusually short periods of time, typically of the order of one-third to one-half the time required for curing in the absence of the anhydride. The advantage of such rapid cure lies in the diminution of the effect of elevated temperatures which may lead to considerable discoloration of the product or a lessening of the flexural strength. These undesirable effects are particularly noted after curing epoxy resins over long periods of time as is required with many prior art curing agents, time periods of at least 2 hours at temperatures of the order of 200° C. being employed. Because of the relatively short curing time required, epoxy resin compositions of the present invention show none of the high temperature effects described above.

Dodecenyl succinic anhydride is readily obtained by standard methods described in the literature. One such method is by heating dodecenyl succinic acid above its melting point under reduced pressure in the presence of phosphorus oxychloride.

The following examples are given by way of illustration and are not to be construed as limitations of this invention, many variations of which are possible within the scope and spirit thereof.

*Example 1*

This example illustrates the unexpected improvement in curing time obtained by heating a phenol epoxy resin with a polyamine in the presence of dodecenyl succinic anhydride.

(a) A mixture of 100 parts of the glycidyl ether of a phenol-acetone condensation having a viscosity within the range of 150 to 210 centipoises, a specific gravity within the range of 1.10–1.12 and containing approximately 1 gram mole of epoxy group per 175 grams, 25 parts of an aliphatic amine-ethylene oxide adduct having a viscosity at 25° C. of 5,000–13,000 centipoises and 5 parts of dodecenyl succinic anhydride was prepared. The mixture was thoroughly stirred to blend the ingredients and maintained at room temperature. In 7 minutes the mixture gelled and a clear, hard resin was obtained.

(b) The above procedure was repeated in the absence of the dodecenyl succinic anhydride. The mixture gelled in 15 minutes and a clear, hard resin was obtained.

*Example 2*

The procedure of Example 1(a) was repeated with the addition of 10 rather than 5 parts of dodecenyl succinic anhydride. The mixture gelled in 5 minutes and a clear, hard resin was obtained.

*Example 3*

The procedure of Example 2 was repeated with the substitution of an aliphatic amine-glycidyl adduct having a viscosity within the range of 3,500–5,000 centistokes at 25° C. for the aliphatic amine-ethylene oxide adduct. The mixture gelled in 4 minutes and a clear, hard resin was obtained.

*Example 4*

This example illustrates the unexpected improvement in curing time obtained by treating a polyglycidyl ether of a phenol-formaldehyde condensation having a viscosity within the range of 6,000–16,000 centistokes and containing approximately 1 gram mole of epoxy group per 178 grams, with a polyamide formed by the reaction of a linoleic acid dimer with ethylene diamine, said polyamide having an amine value of 290–320 and a viscosity within the range of 40,000 to 60,000 centipoises at 25° C. in the presence of dodecenyl succinic anhydride.

(a) A mixture of 50 parts of polyepoxide, 50 parts of the polyamide and 10 parts of dodecenyl succinic anhydride was prepared. The mixture was thoroughly stirred to blend the ingredients and maintained at room temperature. In 30 minutes the mixture gelled and a clear, hard resin was obtained.

(b) The above procedure was repeated in the absence of dodecenyl succinic anhydride. The mixture gelled in 105 minutes and a clear, hard resin was obtained.

Many commercially available epoxy resins may be cured in accordance with the present technique. Among these are the glycidyl ethers of bisphenol, "Bakelite ERL 2774," "Bakelite ERL 3794," "Epi-Rez 504," "Epi-Rez 510," "Epon 820," "Epon 828," etc. The physical properties such as viscosity, melting point, etc. of these epoxy resins are described in the literature, for example, in "Epoxy Resins" by H. Lee and K. Neville, McGraw-Hill Book Company, Inc., New York, N.Y., 1957.

What is claimed is:

1. A method for curing a polyepoxy-polyhydroxy ether resin comprising a glycidyl ether of a polyhydric phenol having a 1,2-epoxy equivalency greater than 1 which comprises admixing the said resin with a curing agent selected from the group consisting of primary polyamines, secondary polyamines and polyamides, said primary and secondary polyamines having at least one available hydrogen atom attached to each of at least two amino nitrogen atoms per molecule, said polyamides containing terminal groups selected from among amine groups, carboxyl groups and mixtures thereof, the number of free groups in said polyamide ranging from 200–320, together with an accelerator consisting essentially of dodecenyl succinic anhydride in an amount within the range of 1–10 parts, by weight, per 100 parts, by weight, of epoxy resin and up to 1 part, by weight, per 2 parts, by weight, of curing agent.

2. The method according to claim 1 wherein said polyamines are capable of providing up to 1 active hydrogen for each epoxide group.

3. The method according to claim 1 wherein said polyamides have an amine number within the range of 200 to 300 and are present in an amount within the range of 45 to 80 parts by weight per 100 parts of epoxy resin.

4. The method according to claim 1 wherein said polyamines are present within the range of 8 to 40 parts by weight per 100 parts of epoxy resin.

References Cited by the Examiner

UNITED STATES PATENTS

| 2,891,026 | 6/1959 | Wasserman | 260—47 |
| 2,935,488 | 5/1960 | Phillips et al. | 260—47 |

OTHER REFERENCES

Lee et al.: "Epoxy Resins," page 15 relied on, McGraw-Hill Book Co. Inc., New York, 1957.

WILLIAM H. SHORT, *Primary Examiner.*

H. BURSTEIN, *Examiner.*

T. D. KERWIN, P. H. HELLER, *Assistant Examiners.*